(12) United States Patent
Guelbahar

(10) Patent No.: US 11,423,813 B2
(45) Date of Patent: Aug. 23, 2022

(54) COMBINATION, DEVICE, VISUALIZATION COMPONENT, ATTACHING MEANS, SOFTWARE PRODUCT IN RELATION TO PERFORMANCE OF WORK IN A HOUSEHOLD

(71) Applicant: INSTITUT FUR RUNDFUNKTECHNIK GMBH, Munich (DE)

(72) Inventor: Mark Guelbahar, Landshut (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 606 days.

(21) Appl. No.: 16/315,555

(22) PCT Filed: Jul. 6, 2017

(86) PCT No.: PCT/EP2017/067011
§ 371 (c)(1),
(2) Date: Jan. 4, 2019

(87) PCT Pub. No.: WO2018/007553
PCT Pub. Date: Jan. 11, 2018

(65) Prior Publication Data
US 2021/0294332 A1  Sep. 23, 2021

(30) Foreign Application Priority Data
Jul. 6, 2016  (IT) .................. 102016000070582

(51) Int. Cl.
*G09F 19/08*  (2006.01)
*G09F 21/04*  (2006.01)
(Continued)

(52) U.S. Cl.
CPC ............ *G09F 19/08* (2013.01); *A01D 34/008* (2013.01); *A47L 9/2852* (2013.01); *A47L 9/2857* (2013.01);
(Continued)

(58) Field of Classification Search
CPC .. G05D 1/0212; G05D 1/0088; G05D 1/0255; G05D 2201/0203;
(Continued)

(56) References Cited

U.S. PATENT DOCUMENTS

| 4,208,834 A | * | 6/1980 | Lin | ................... | A63H 3/06 |
| | | | | | 446/226 |
| 5,090,789 A | * | 2/1992 | Crabtree | ............... | G09F 19/18 |
| | | | | | 359/10 |

(Continued)

FOREIGN PATENT DOCUMENTS

| CN | 105313123 A | 2/2016 |
| CN | 205521440 U * | 8/2016 |

(Continued)

OTHER PUBLICATIONS

European Examination Report dated Mar. 25, 2021, from Application No. 17735161.6.
(Continued)

*Primary Examiner* — Richard M Camby
(74) *Attorney, Agent, or Firm* — Workman Nydegger (57) ABSTRACT

A combination for performing work in a household environment includes a device with a performance unit for performing the work, a moving apparatus for moving the device on a surface, a control unit for controlling the moving apparatus for autonomous maneuvering on the surface, and a visualization component, wherein the visualization component includes a two-dimensional or three-dimensional visualization element in a shape of a human, an animal, a
(Continued)

plant, a household object, a fantasy figure, a moving apparatus, in particular a vehicle, an airplane, or a ship, and wherein the visualization element is at least partially formed by a light projection and/or as an inflatable unit.

12 Claims, 6 Drawing Sheets

(51) Int. Cl.
| | |
|---|---|
| *G09F 19/00* | (2006.01) |
| *A01D 34/00* | (2006.01) |
| *A47L 9/28* | (2006.01) |
| *A47L 9/30* | (2006.01) |
| *A47L 11/40* | (2006.01) |
| *G05D 1/00* | (2006.01) |
| *G05D 1/02* | (2020.01) |
| *G09F 19/18* | (2006.01) |
| *G09F 23/00* | (2006.01) |
| *A01D 101/00* | (2006.01) |

(52) U.S. Cl.
CPC ............. *A47L 9/30* (2013.01); *A47L 11/4008* (2013.01); *A47L 11/4011* (2013.01); *G05D 1/0088* (2013.01); *G05D 1/0212* (2013.01); *G05D 1/0255* (2013.01); *G09F 19/008* (2021.05); *G09F 19/18* (2013.01); *G09F 21/04* (2013.01); *G09F 21/042* (2020.05); *G09F 23/0058* (2013.01); *A01D 2101/00* (2013.01); *A47L 2201/04* (2013.01); *G05D 2201/0201* (2013.01); *G05D 2201/0203* (2013.01)

(58) Field of Classification Search
CPC ........... G05D 2201/0201; A47L 9/2857; A47L 11/4008; A47L 9/30; A47L 9/2852; A47L 11/4011; A47L 2201/04; A01D 34/008; A01D 2101/00; G09F 21/04; G09F 19/008; G09F 19/18; G09F 23/0058
See application file for complete search history.

(56) References Cited

U.S. PATENT DOCUMENTS

| | | | | |
|---|---|---|---|---|
| 5,311,335 | A * | 5/1994 | Crabtree | G09F 19/18 362/811 |
| 5,572,375 | A * | 11/1996 | Crabtree, IV | G02B 30/50 359/858 |
| 6,522,311 | B1 * | 2/2003 | Kadowaki | G09F 19/18 345/7 |
| 9,091,911 | B2 * | 7/2015 | Christensen | H04N 9/3147 |
| 9,225,929 | B2 * | 12/2015 | Helms | H04N 5/74 |
| 2011/0102688 | A1 * | 5/2011 | De Boer | G03B 21/28 349/5 |
| 2013/0321716 | A1 * | 12/2013 | Helms | H04N 5/74 348/744 |
| 2016/0078791 | A1 * | 3/2016 | Helms | H04N 9/3141 348/789 |

FOREIGN PATENT DOCUMENTS

| | | |
|---|---|---|
| DE | 10 2012 210573 A1 | 7/2013 |
| JP | 2000 135186 A | 5/2000 |
| JP | 2014-227 A | 1/2014 |
| JP | 3191142 U | 4/2014 |
| JP | 2015-148678 A | 8/2015 |
| JP | 2015-160022 A | 9/2015 |
| KR | 10-2003-0024138 A | 3/2003 |
| KR | 10-1023282 B1 | 3/2011 |
| LT | 2 010 016 A | 8/2011 |

OTHER PUBLICATIONS

Korean Office Action dated Mar. 23, 2021, English translation, for Application No. 10-2019-7003435.
International Search Report and Written Opinion dated Jan. 24, 2018, issued in PCT Application No. PCT/EP2017/067011 filed Jul. 6, 2017.

* cited by examiner

COMBINATION, DEVICE, VISUALIZATION COMPONENT, ATTACHING MEANS, SOFTWARE PRODUCT IN RELATION TO PERFORMANCE OF WORK IN A HOUSEHOLD

BACKGROUND OF THE INVENTION

1. The Field of the Invention

The present invention relates to a combination, a device, a visualization component, an attaching means, and a software product for performing work in a household environment.

2. The Relevant Technology

It is known that more and more autonomous household machines for performing work in households are employed. In this, autonomous vacuum cleaners, polishing machines, lawn mowers and small robots are used, which perform a predefined work on the floor or on the earth or ground, wherein said devices comprise an autonomous navigation or maneuverability.

SUMMARY OF THE INVENTION

It is an object of the present invention to improve said work machines in the household sector.

The object of the present invention is achieved by the appended claims, which are directed to a combination, a device, a visualization component, an attaching means, and a software product.

According to one aspect of the present invention, a combination for performing work in a household environment is proposed, wherein the combination consists of a device with a performance unit for performing the work, a moving means for moving the first device on a surface, a control unit for controlling the moving means for autonomous maneuvering on the surface, and a visualization component. In a first instance said combination relates substantially to the device, which performs the intended work. The intended work may be, for example, vacuuming, wiping, polishing, lawn mowing, or similar work, which is primarily performed on the floor or on the earth. In addition to the provided moving means, which e.g., may be in the form of a wheel, the control unit is also provided, which is provided for the autonomous maneuvering and a route determination of the combination. The control unit is provided with an algorithm or suitable logic to enable an automatic control. According to the invention, however, the visualization component is also provided to visualize the combination and/or for other purposes, as will be explained in the following.

According to a further aspect of the present invention, the visualization component is disposed in a region above the device, wherein the region above the device is defined by deployment of the device for performing the intended work. This significantly improves the visualization by the visualization component since the device mostly moves as a flat body with a low height on the floor, such that it poses a dangerous tripping hazard for people in the surroundings.

According to a further aspect of the present invention, the visualization component is a two-dimensional or three-dimensional visualization element in a shape of a human, an animal, a plant, a household object, a fantasy figure, a moving means, in particular a vehicle, an airplane, or a ship. The invention provides that as a visualization component both two-dimensional and three-dimensional visualization elements may be used. Due to the visualization in the form of said shapes the optical effect and therefore the perception are highly improved. Furthermore, for example, a simulation regarding the actual presence of one of said shapes in the household or garden area occurs, such that the safety, in particular a burglar security in the house and garden, is also improved since potential burglars deem someone to be present in the house or in the garden and are deterred to break in.

According to a further aspect of the present invention the visualization element is formed at least partially by a light projection and/or as an inflatable unit. Preferably the light projection relates to a light source for producing a 2D- and/or 3D-figure, wherein both common light sources, such as lamps, energy saving lamps and/or LED-lamps as well as laser-based light sources may be used. Preferably, a projector is used for the light projection. More preferably, an arrangement for displaying holograms may be used for displaying the visualization element to produce three-dimensional light projections. The invention furthermore also provides that, alternatively or in combination, an inflatable unit is used, wherein the inflatable unit is formed as a body, which is inflated by means of an airstream, to present a three-dimensional body. The inflatable unit is in particular provided with an air inlet and/or an air outlet, so that the blown-in air is substantially directed into the body and is substantially fully retained in the body or flows out of the provided air outlet again. Said discharge of the air preferably results in a wave like movement of the inflatable unit or body. The inflatable unit consists in particular of an easily inflatable material, at least partially flexible material, in particular a plastic fabric and/or cloth fabric, which may be lifted and hover in the air by a relatively small air supply.

According to a further aspect the visualization components may be activated and or deactivated manually, depending on a movement information, depending on an acoustic signal from the surroundings of the combination, and/or on an external signal, in particular on a security system. The visualization components may be coupled with a security system and may be switched on on-demand, such that from an energetic point of view a demand-orientated switching on and off is advantageous. Alternatively, or in addition sensors may be used, in particular motion sensors, acoustic sensors or thermal energy sensors, to facilitate a demand-orientated switching on and off.

Preferably, the device in the combination according to the invention comprises a vacuum cleaner, a lawn mower, a cleaning device, a polishing device or any arbitrary device for performing work on the floor and/or on the earth.

According to the invention, it is preferably provided that either the device or the visualization component comprises at least a receiving unit for receiving visualization data from a visualization element. Advantageously, the visualization data may be received and displayed by the receiving unit by means of a transmitter, such that the visualization data do not need to be provided locally on the combination. Accordingly, the weight of the combination is also reduced and hence the consumption of electrical energy in the combination.

Preferably the device according to the present invention is equipped with an interface to receive control signals from other electronic devices, in particular from smartphones, smart-TV, PC, tablet PC, internet radio, video recording devices etc.

Preferably the device according to the present invention is adapted to visualize related visualization data dependent on a consumed content by the user, for instance a video, audio, computer game, entertaining content, from a provider of audio-visual contents. Preferably, a corresponding singer, actor/actress, advertisement, music track, additional information and/or metadata is used for visualization.

According to the invention, it is furthermore preferable that the device and the visualization components are connected to each other by means of an attaching arrangement, wherein at least one of both comprises an attaching means.

According to the invention, it is furthermore proposed that the device is provided with an attaching means and is adapted for use in a combination according to the invention described herein.

According to the invention, a visualization component is proposed having an attaching means for use in a combination according to the invention described herein.

According to the invention, an attaching means is furthermore proposed, which is adapted for use with a combination according to the invention described herein or with a device according to the devices described herein or with a visualization components according to the visualization components described herein.

According to the invention also a software product for providing visualization data of a visualization element is proposed. The software product is preferably stored on a storage medium, in particular on a SSD, a hard drive, a serve, CD, DVD or similar media.

BRIEF DESCRIPTION OF THE DRAWINGS

In the following several embodiments according to the present invention are described by means of Figures.

DETAILED DESCRIPTION OF THE PREFERRED EMBODIMENTS

Figure 1:
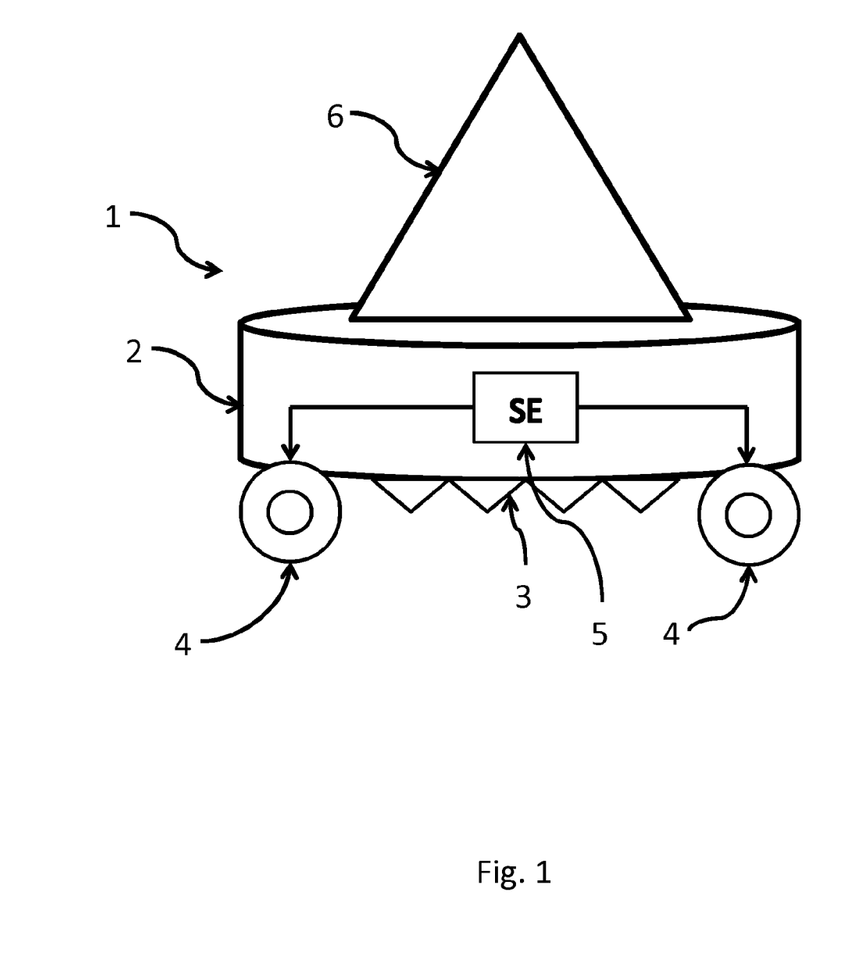
FIG. 1 shows a combination according to the invention with an abstractly depicted visualization component.

FIG. 1 shows a combination 1 having a device 2 with a performance unit 3 for performing cleaning work or vacuuming work, moving means 4 for moving the device 2, and a control unit (SE) 5 for control. The combination 1 also comprises a visualization component 6, wherein the visualization component 6 is abstractly depicted as a triangle 6 in FIG. 1, wherein this only symbolizes the region above the device 2, which may be used to provide a visualization component 6.

Figure 2:
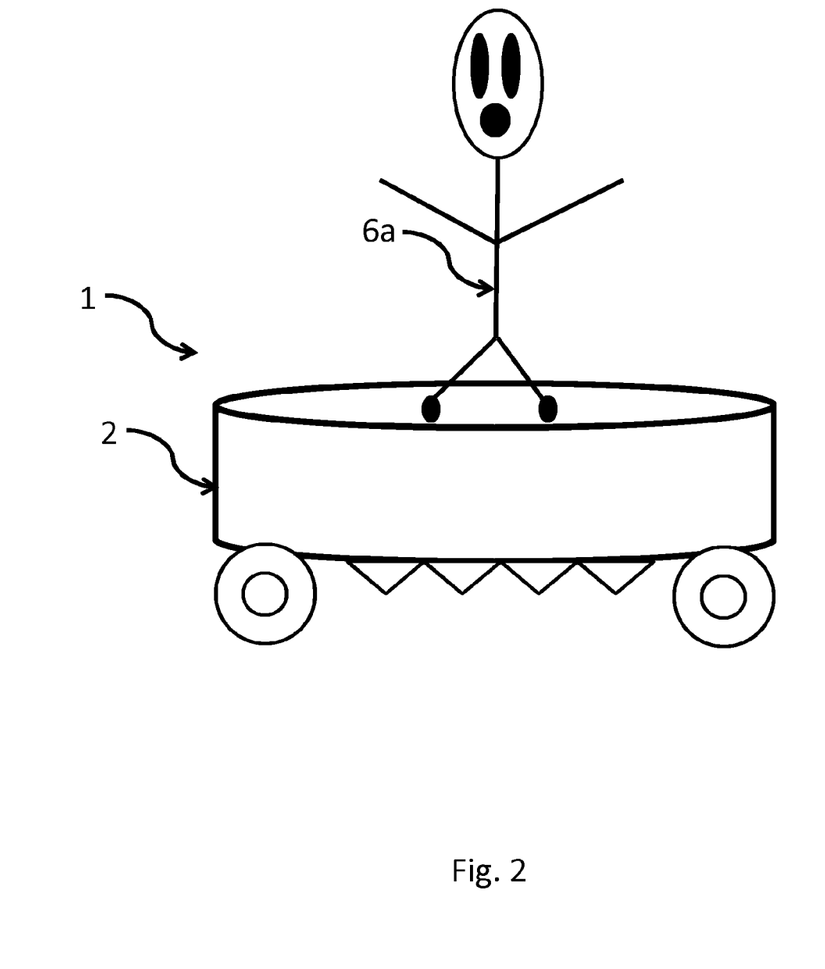
FIG. 2 shows a combination according to the invention, wherein the visualization component comprises a visualization element schematically depicted as a human.

FIG. 2 shows a further combination 1 according to the invention, wherein the device 2 is identical to the device 2 depicted in FIG. 1 and wherein a visualization component 6a in a human-like FIG. 6a as a visualization element is depicted above the device 2.

Figure 3:
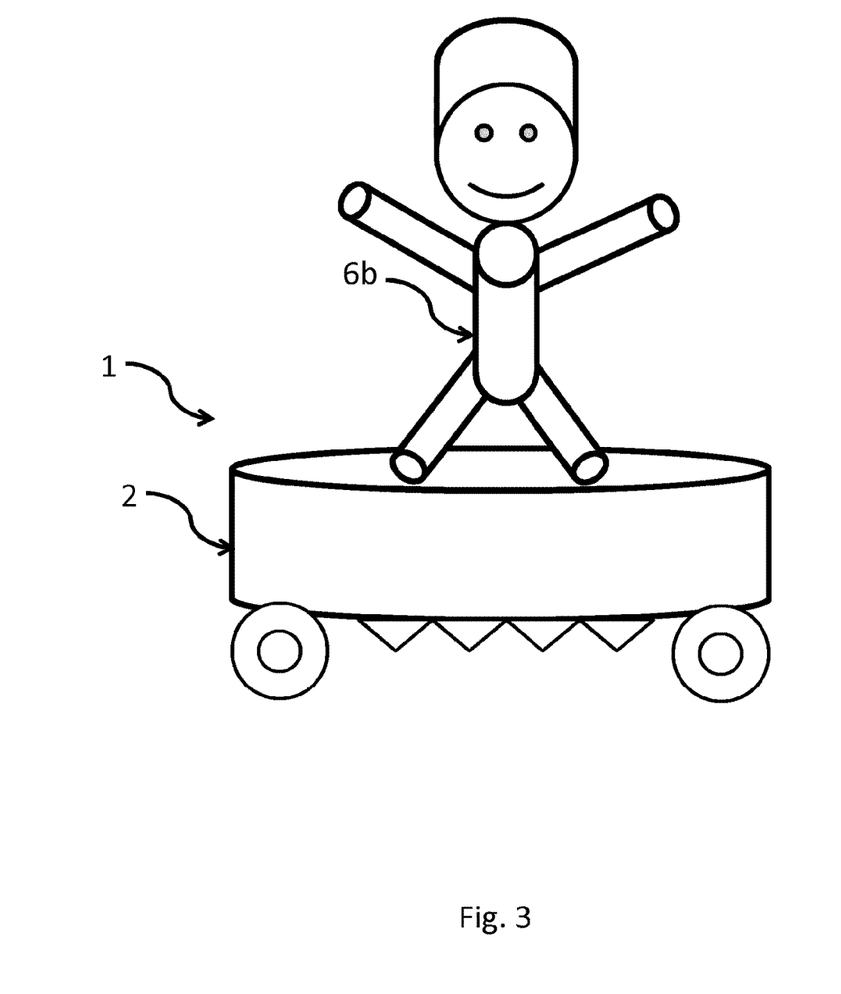
FIG. 3 shows a combination according to the invention, wherein the visualization component comprises a three-dimensional human-like figure as a visualization element.

FIG. 3 shows a combination 1 according to the invention, wherein the same device 2 as in FIGS. 1 and 2 is used and wherein the visualization component 6b is formed as a three-dimensional human-like shape.

Figure 4:
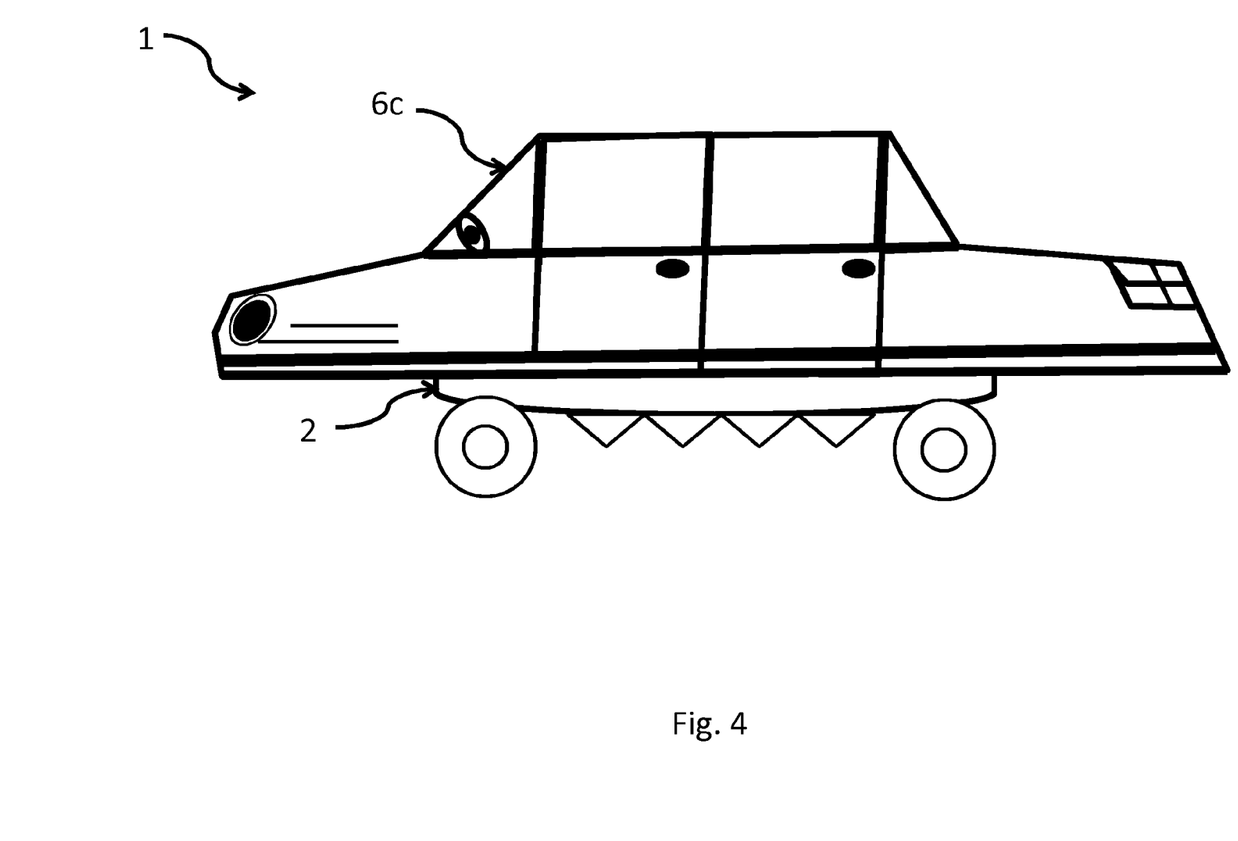
FIG. 4 shows a combination according to the invention, wherein the visualization component comprises a three-dimensional vehicle as a visualization element.

FIG. 4 shows a combination 1 according to the invention with the same device 2 as in the previous Figures having another three-dimensional visualization component 6c depicted as a three-dimensional car as a visualization element.

Figure 5:
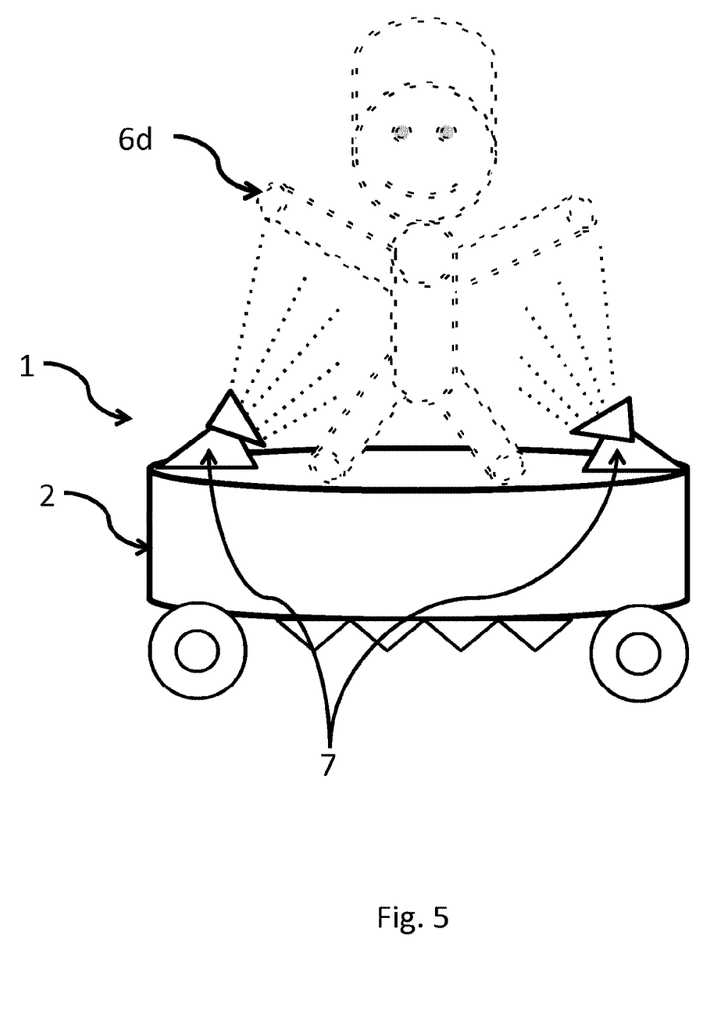
FIG. 5 shows a combination according to invention, wherein the visualization component comprises a light projection in a shape of a human as a visualization element.
Figure 6:
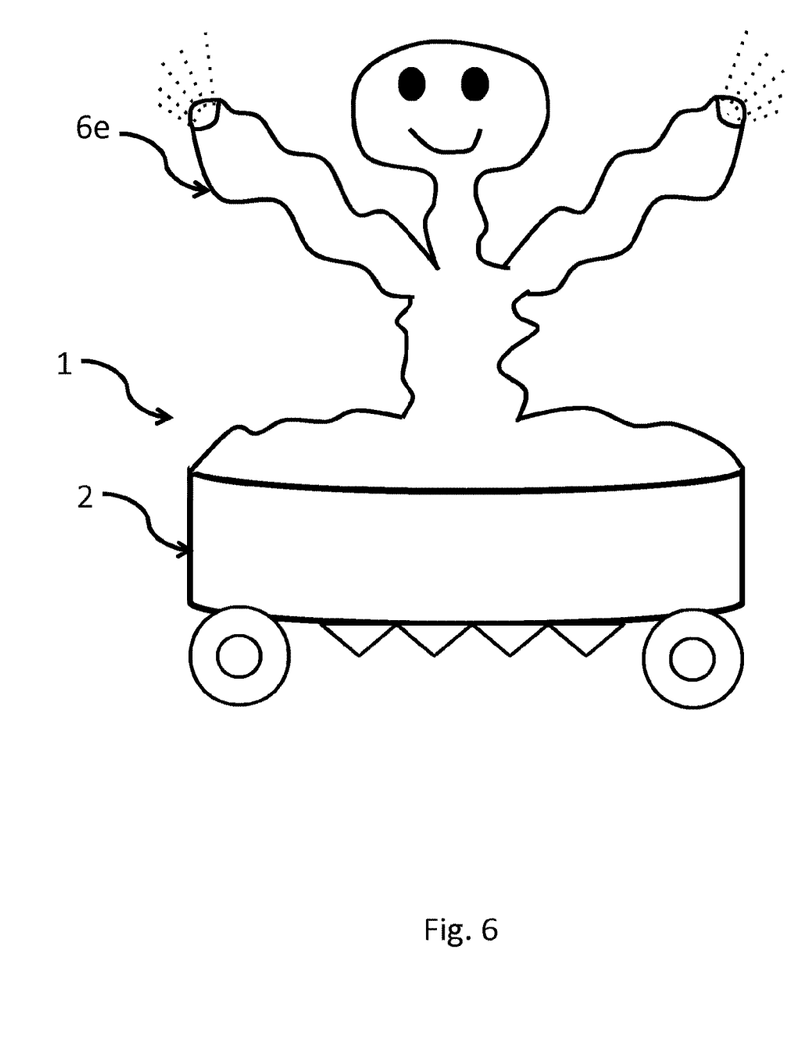
FIG. 6 shows a combination according to the invention, wherein the visualization component comprises an inflatable unit in a human-like shape as a visualization element.

FIG. 5 shows a further combination 1 according to the invention with the same device 2 as in the previous Figures. The device 2 in FIG. 5 comprises two light projectors 7 on its top surface with which the visualization component 6d is implemented as a light projection of a human-like figure. The visualization element 6d is depicted with dashed lines to depict the light projection. FIG. 6 shows a further combination 1 according to the invention with the same device 2 as in the previous Figures. The device 2 comprises an inflatable unit 6e on its top surface as a visualization component. The inflatable unit 6e is formed as a three-dimensional human-like figure.

The elements and characteristics described in the various forms of preferred embodiments can be mutually combined without departing from the scope of the invention.

Further implementation details will not be described, as the man skilled in the art is able to carry out the invention starting from the teaching of the above description.

The invention claimed is:

1. A combination for performing work in a household environment, wherein said combination comprises:
    a device with a performance unit for performing said work,
    a moving means for moving said device on a surface,
    a visualization component configured to generate a two-dimensional or three-dimensional moving visualization element in a shape of a human, an animal, a plant, a household object, a fantasy figure, or a moving vehicle, said moving visualization element being at least partially formed by a moving hologram and/or a moving inflatable unit, and
    a control unit configured to control said moving means for autonomous maneuvering on said surface and control said visualization component for generating said two-dimensional or three-dimensional moving visualization element,
    wherein the control unit is also configured to:
        receive an external signal from a security system, said external signal indicating that a motion or a sound is detected, and
        in response to receiving said external signal from said security system, cause said visualization component to generate said two-dimensional or three-dimensional moving visualization element.

2. The combination according to claim 1, wherein the device is a vacuum cleaner, a lawn mower, a polishing device, or a device for performing work on a floor and/or on earth.

3. The combination according to claim 1, wherein the device or the visualization component comprises a receiving unit for receiving visualization data of said moving visualization element.

4. The combination according to claim 1, wherein the device or the visualization component comprises an attaching means.

5. A software product for providing visualization data of the moving visualization element according to claim 3.

6. The combination of claim 1, the security system further comprising a sensor configured to detect a motion or a sound in said household environment,     wherein said visualization component is switched on in response to said sensor detecting said motion or said sound in said household environment.

7. The combination of claim 6, wherein the sensor comprises a motion sensor configured to detect said motion.

8. The combination of claim 6, wherein the sensor comprises an acoustic sensor configured to detect said sound.

9. The combination of claim 1, wherein said moving visualization element comprises a moving inflatable unit.

10. The combination of claim 6, wherein in response to detecting, by said sensor, said motion or said sound in said household environment, said control unit also causes said moving means to move said device on said surface.

11. The combination of claim 1, wherein in response to receiving said external signal from said security system, the control unit is further configured to cause said moving means to move said device on said surface.

12. The combination of claim 1, wherein said moving visualization element comprises a moving hologram.

\* \* \* \* \*